UNITED STATES PATENT OFFICE.

GEORGE WASHINGTON NEWELL, OF MAPLEVILLE, ASSIGNOR OF ONE-HALF TO ARTHUR ARRINGTON, OF LOUISBURG, NORTH CAROLINA.

PROCESS OF PREPARING COTTON-SEED FOR PLANTING.

SPECIFICATION forming part of Letters Patent No. 400,786, dated April 2, 1889.

Application filed July 16, 1887. Serial No. 244,531. (No specimens.)

*To all whom it may concern:*

Be it known that I, GEORGE WASHINGTON NEWELL, a citizen of the United States, residing at Mapleville, in the county of Franklin and State of North Carolina, have invented new and useful Improvements in the Preparation of Cotton-Seed for the Purpose of Planting, whereby, first, earlier germination of the seed is secured and, second, instead of the process of sowing the seed in drills, the dropping of the seed for a crop to approximate a stand is rendered practicable, so that the use of hoes in the cultivation of the crop is very considerably reduced; and I do hereby declare that the following is a full, clear, and exact description of the invention, which will enable others skilled in the art to which it appertains to make and use the same.

The object of my invention is to remove the lint from cotton-seed for planting, thereby, first, insuring the speedy germination and so rendering it practicable (by thus arranging for the cotton to come up to a stand ahead of the grass) to plant a cotton crop by dropping only sufficient seed to secure, just where they are desired, not many more plants than approximate a stand, and thereby, second, also making it practicable to drop seed by planters instead of sowing them, as is now done.

By my invention a great saving of expense in the first cultivation of the cotton crop is effected.

To carry my invention into effect, I treat cotton-seed, taken in the condition in which they come from the gins, with diluted sulphuric acid for a definite time to remove the fibrous lint from their hulls, and my practice is to take the seed in the condition above mentioned and put them first in suitable vessels, in which I then put enough of the sulphuric acid of commerce to about two-thirds cover the quantity of seed taken. I then add a quantity of pure water equal to about half the quantity of acid which I have used, thus covering the seed. I now stir the seed in the acid solution with a wooden stick or paddle for a few minutes—say from two to five minutes—till, as the result of the chemical reaction of the acid, the adhering lint has been removed. At once I take the seed out of the solution, either by dipping them out with a perforated wooden dipper, or, preferably, by drawing off the solution, or I may lift the tub or vat containing it and pour off the remaining solution into another tub. Having separated the seed from the diluted acid, I at once rinse them with pure water. This I do both to prevent the acid from eating into the seed-germs and to put the seed in condition to be handled. The seed may now be planted immediately; but it will be better to let them remain in water and soak for from twelve to twenty-four hours, thus softening the hulls and swelling the germs.

To economize the use of acid, I preserve the solution which I have once used, and by adding to it again first acid and then water, in the relative proportions at first used, and of the two taken together about one-third as much of the new mixture as there remains of the old, I bring about again a reaction, which proves efficient, though requiring about twice the length of time originally taken to clean the seed of the lint—say from four to eight minutes—the seed being meanwhile thoroughly stirred in the solution; and I proceed in this way repeatedly, making the solution previously used the basis of the next preparation; and I have further utilized the acid by allowing other seed to remain from twelve to twenty-four hours in the solution that had been previously used, thus removing the lint effectually by the secondary effects of the acid. I may remark, also, that even after this the entire potency of the acid is not exhausted; but I find it still valuable for reducing bones and compost-heaps made up of coarse materials.

Any suitable glass or wooden vessels (as tubs, vats, or tanks) may be used in which to treat the seed; but metal vessels should not be used, and much care should be taken that the acid be not allowed to come in contact either with the person or clothing of the manipulator, as it is injuriously corrosive. My practice is to use tubs made by sawing second-hand kerosene-oil barrels in two, in which to treat one bushel of seed at a time. These I find suitable for the purpose, and also convenient and cheap.

By this process all the adhering lint, which hindered easy distribution and early germination of the seed, is removed and a speedy development of the young plants facilitated, so that generally one-third the ordinary time that is required between planting the seed and getting the young plants up is saved; and in this way also the young plants are brought up so much sooner than usual that the growth of grass is anticipated, and the plows may be used at the outset as soon as the young plants are well up. The seed thus prepared can be planted just where plants are wanted to stand and in such numbers as to require but little, if any, thinning out with hoes. When the hoes are being used later in the season for grassing the cotton, the few hills which may have any redundancy of plants can be readily and easily thinned out to the usual stand; and these prepared seed may be dropped by planters, by easily and readily adapting almost any of the many devices now in use for dropping other kinds of seed, as peas and the like.

An important advantage of this process is that by it the crop is planted with from one-sixth to one-tenth the quantity of seed ordinarily used, thus effecting a considerable saving. Another of its advantages is that if after planting a first time the conditions have been found unfavorable for the germination of the seed, as is now frequently the case, the crop can be planted over again with but little expense and not requiring in the aggregate so many seed, and but little, if any, more time than is usually required for one planting and the bringing up of the crop by the existing method. My experience with seed thus prepared is that a solution of the strength of two parts sulphuric acid to one part of water does not injure the germinating qualities of the seed for the few minutes of the reaction, nor for several hours of the secondary action of the acid, but that it rather improves the seed in this respect. I find also that I can get the plants up in from six to twelve days, while by the existing methods it requires a much longer time. By my process the plants require no chopping out, and may be sided with sweeps in twelve to eighteen days from planting, thus killing the first grass in the germ, or while so young as to be easily killed, and also saving one plowing.

Having fully described my invention, I do not claim, broadly, the treating of cotton-seed with sulphuric acid for removing the lint from the hulls; but What I do claim specifically as my invention, and desire to secure by Letters Patent, is—

1. The hereinbefore-described process of preparing cotton-seed for planting, destroying the adherent fibrous matter, which consists in placing the cotton-seed in the condition in which it comes from the gin into a suitable vessel, or into suitable vessels, then pouring upon it a quantity of the sulphuric acid of commerce to cover it about two-thirds, adding a quantity of water equal to about one-half the quantity of acid, thus covering the seed, then stirring and allowing to remain for a few minutes, and then removing and soaking, substantially as set forth.

2. The process of preparing cotton-seed for planting, which consists in treating the seed with a solution composed of about two parts of sulphuric acid of commerce and about one part of water.

GEORGE WASHINGTON NEWELL.

Witnesses:
 JNO. H. UZZELL,
 WILLIAM E. UZZELL.